United States Patent
Feather et al.

(10) Patent No.: US 10,735,195 B2
(45) Date of Patent: Aug. 4, 2020

(54) HOST-STORAGE AUTHENTICATION

(71) Applicant: HEWLETT PACKARD ENTERPRISE DEVELOPMENT LP, Houston, TX (US)

(72) Inventors: Stanley S Feather, Fort Collins, CO (US); Kurt William Heberlein, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 173 days.

(21) Appl. No.: 15/741,990

(22) PCT Filed: Aug. 12, 2015

(86) PCT No.: PCT/US2015/044806
§ 371 (c)(1),
(2) Date: Jan. 4, 2018

(87) PCT Pub. No.: WO2017/027026
PCT Pub. Date: Feb. 16, 2017

(65) Prior Publication Data
US 2018/0198616 A1    Jul. 12, 2018

(51) Int. Cl.
*H04L 9/32* (2006.01)
*H04L 29/06* (2006.01)
*H04L 29/08* (2006.01)

(52) U.S. Cl.
CPC ............ *H04L 9/321* (2013.01); *H04L 9/3247* (2013.01); *H04L 9/3263* (2013.01);
(Continued)

(58) Field of Classification Search
CPC ..... H04L 9/321; H04L 9/3247; H04L 9/3263; H04L 9/3273; H04L 63/0823
See application file for complete search history.

(56) References Cited

U.S. PATENT DOCUMENTS 7,756,986 B2    7/2010 Blumenau et al.
8,127,034 B2    2/2012 Gilfix et al.
(Continued)

FOREIGN PATENT DOCUMENTS

CN    101119205 A    2/2008
CN    102546764 A    7/2012
(Continued)

OTHER PUBLICATIONS

Lorch et al., A hardware-secured credential repository for Grid PKIs, IEEE International Symposium on Cluster Computing and the Grid, Apr. 2004, pp. 640-647 (Year: 2004).*
(Continued)

*Primary Examiner* — Kenneth W Chang
(74) *Attorney, Agent, or Firm* — Hewlett Packard Enterprise Patent Department

(57) ABSTRACT

Example implementations may relate to a host and a storage system that communicate by a block storage protocol. For example, the host may embed host credentials in a data packet of the block storage protocol, and the data packet of host credentials may be cryptographically signed by a certificate authority trusted by a user of the host to generate a signed credential packet. The signed credential packet may be transmitted in a data path between the host and the storage system. The storage system may validate the signed credential packet using enrollment credentials and a certificate authority certificate and may authenticate the host to a logical unit.

20 Claims, 7 Drawing Sheets

(52) U.S. Cl.
CPC .......... *H04L 9/3271* (2013.01); *H04L 9/3273* (2013.01); *H04L 63/0823* (2013.01); *H04L 67/34* (2013.01)

(56) References Cited

U.S. PATENT DOCUMENTS

| | | | |
|---|---|---|---|
| 8,230,010 B1 | 7/2012 | Hardjono et al. | |
| 8,862,899 B2 | 10/2014 | Rastogi et al. | |
| 9,184,917 B2* | 11/2015 | Medvinsky | G06F 21/10 |
| 9,332,002 B1* | 5/2016 | Bowen | H04L 63/0823 |
| 2002/0178121 A1* | 11/2002 | Sung | G06Q 20/00 |
| | | | 705/64 |
| 2003/0216143 A1* | 11/2003 | Roese | G01S 5/02 |
| | | | 455/456.1 |
| 2004/0008666 A1* | 1/2004 | Hardjono | H04L 63/0823 |
| | | | 370/352 |
| 2004/0193906 A1* | 9/2004 | Dar | H04L 29/06 |
| | | | 726/13 |
| 2004/0233910 A1 | 11/2004 | Chen et al. | |
| 2005/0076198 A1* | 4/2005 | Skomra | H04L 9/321 |
| | | | 713/156 |
| 2007/0074292 A1 | 3/2007 | Mimatsu | |
| 2008/0077592 A1* | 3/2008 | Brodie | G06F 21/31 |
| 2008/0155262 A1 | 6/2008 | Beaver et al. | |
| 2009/0013141 A1 | 1/2009 | Kinoshita | |
| 2010/0005315 A1* | 1/2010 | Abdallah | H04L 9/3231 |
| | | | 713/186 |
| 2012/0303951 A1* | 11/2012 | Medvinsky | G06F 21/10 |
| | | | 713/157 |
| 2013/0179993 A1 | 7/2013 | Sandler et al. | |
| 2013/0346748 A1 | 12/2013 | Orsini et al. | |
| 2014/0068732 A1 | 3/2014 | Hinton et al. | |
| 2014/0359280 A1* | 12/2014 | Saboor | H04L 63/0823 |
| | | | 713/156 |
| 2015/0026777 A1 | 1/2015 | Bell | |
| 2016/0285638 A1 | 9/2016 | Pearson et al. | |

FOREIGN PATENT DOCUMENTS

| | | |
|---|---|---|
| CN | 103248479 A | 8/2013 |
| KR | 20110064195 A | 6/2011 |

OTHER PUBLICATIONS

Hibbard, E., Fibre Channel Security Protocols and Hitachi Storage, Jan. 2007, Hitachi Data Systems, Technology Brief, 15 pages.
International Preliminary Report on Patentability received in PCT Application No. PCT/US2015/044806, dated Feb. 22, 2018, 10 pages.
International Search Report & Written Opinion received in PCT Application No. PCT/US2015/044806, dated May 11, 2016, 13 pages.

* cited by examiner

HOST-STORAGE AUTHENTICATION

BACKGROUND

Computer networks can be implemented to allow networked devices, such as personal computers, servers, data storage devices, etc., to communicate and share resources. One type of network implementation is a storage area network, which can, for example, connect storage devices with host systems. Some storage devices and storage area networks may form part of multi-tenant environments.

BRIEF DESCRIPTION OF THE DRAWINGS

Various examples will be described below with reference to the following figures.

Throughout the drawings, identical reference numbers may designate similar, but not necessarily identical, elements.

DETAILED DESCRIPTION

A host system, such as a server, a desktop computer, a workstation, a laptop computer, or other computing device, may connect to a storage system via a network, such as a storage area network. For example, the storage system may include a disk array and may provide a logical unit of block-based storage to the host system. Some storage devices and storage area networks may be included in a multi-tenant environment that provides multiple tenants (i.e., different clients and customers) and their respective host systems with storage. Some of the tenants may be competitors. Thus, strong security and isolation among tenants may be useful. Some security methods may include logical unit number masking, storage area network zoning, access control lists, or the like. For example, a host system may be authorized to access a logical unit if a worldwide name of the host system is associated with the logical unit on an access control list. However, worldwide names may be spoofed or an access control list may be erroneously configured by a storage system administrator. Other security methods may be complex, costly, or protocol specific. It may be desirable for a host to authenticate to a logical unit using a robust, protocol-independent scheme.

The systems and techniques of the present application may, in some example implementations, embed credentials identifying a host into a data packet of a block storage protocol and request a certificate authority trusted by a user of the host to cryptographically sign the data packet of credentials to generate a signed credential packet. The signed credential packet may then be interleaved by a host agent into a data path between the host and the storage system. The signed credential packet may be validated by a storage manager of the storage system against enrollment credentials, using a certificate authority certificate of the host user to verify the signature of the credential packet. Accordingly, the systems and techniques of the present application may be useful for authenticating a host to a logical unit.

Figure 1:
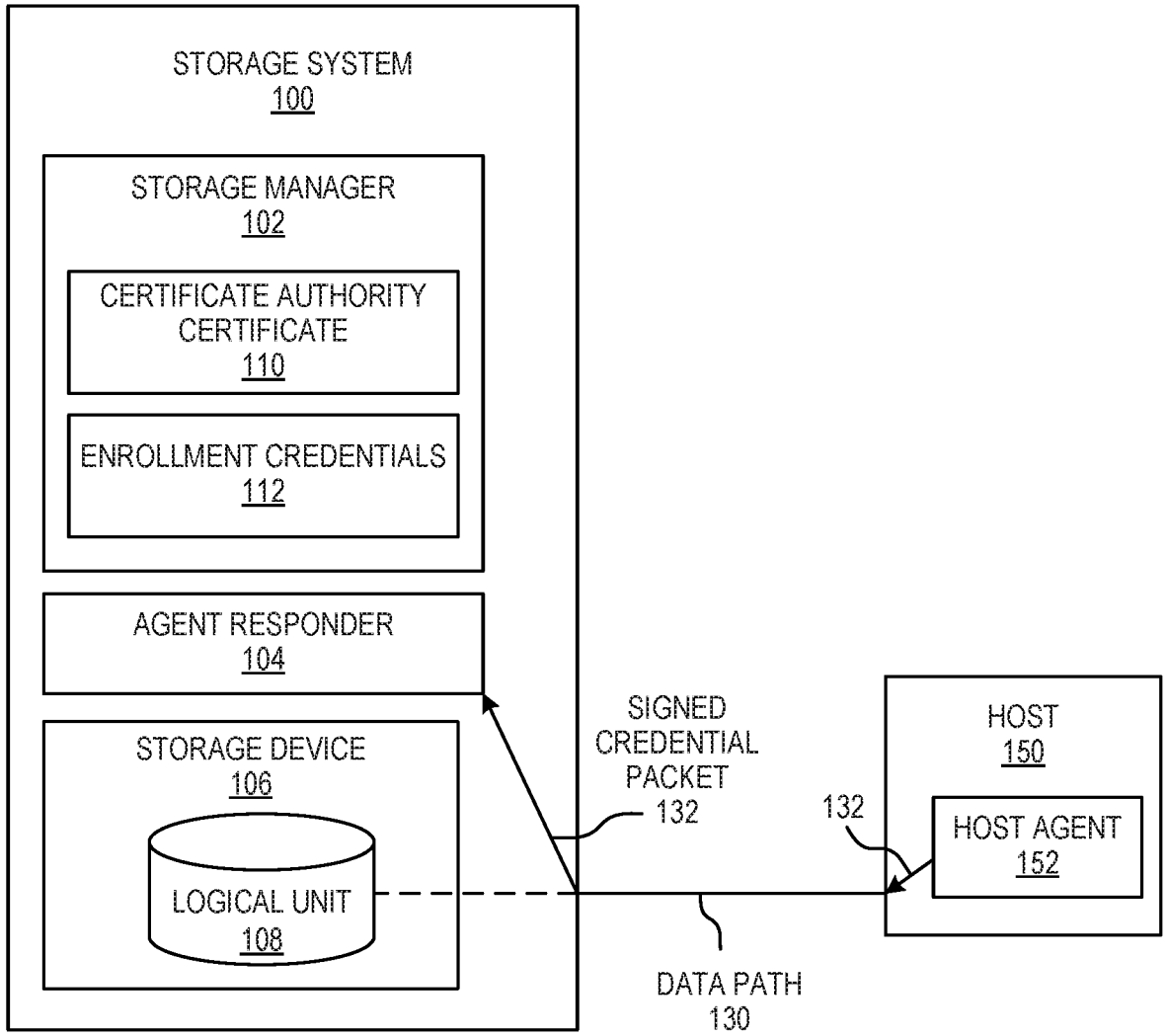
FIG. 1 is a block diagram of an example storage system that may authenticate a host to a logical unit, according to an implementation.

Referring now to the figures, FIG. 1 is a block diagram of an example storage system 100 that may authenticate a host to a logical unit, according to an implementation. The storage system 100 may be connected by a storage area network (SAN) fabric (e.g., Fibre Channel or Ethernet infrastructure) to a host 150 (e.g., a server, a desktop computer, a workstation, a laptop computer, or other computing device), and the storage system 100 may provide dedicated block storage for the host 150. In an example, the host 150 and the storage system 100 may each include respective host bus adapters, and those respective host bus adapters may be connected by a SAN fabric made up of switches and cabling. The host 150 and the storage system 100 may transfer or communicate input/output (I/O) traffic over the SAN fabric using a block storage protocol, such as Fibre Channel Protocol, Internet Small Computer System Interface (iSCSI), ATA over Ethernet (AoE), Fibre Channel over Ethernet (FCoE), or the like, which may carry Small Computer System Interface (SCSI) commands.

Each device in or connected to the SAN fabric, including the host 150, the storage system 100, and switches, may be described by an identifier (ID). For example, a worldwide name may identify a device (e.g., a host bus adapter of the host 150, a switch, or a host bus adapter of the storage system 100) and a worldwide port number may identify a port of the device. Additionally, each port in the SAN fabric may be addressed by a unique port identifier or address (e.g., a 24-bit number) for routing I/O traffic between the host 150 and the storage system 100. For example, each port of a host bus adapter of the host 150 may have a host port ID, and each port of a host bus adapter of the storage system 100 may have a storage port ID. Collectively, host port IDs and storage port IDs may be referred to as port IDs, in some instances. Ports of switches in the SAN fabric also may have port identifiers. In some implementations, host port IDs, storage port IDs, and other SAN port IDs are static for a given connection or arrangement of components, and a port ID may change if the corresponding device is moved to a different location on the SAN.

In some implementations, the term "data path" may refer to a path between the storage system 100 and the host 150 through the SAN fabric by which I/O traffic is routed. In contrast, a separate "management path" may also be employed, by which a storage administrator (e.g., a computing device operated by an administrator of the storage system 100) may configure how the storage system 100 and the data path are used. For example, the management path may be carried over an Ethernet connection (separate from the SAN fabric) between the storage administrator and the storage system 100.

The storage system 100 may include a storage manager 102, an agent responder 104, and a storage device 106. The storage device 106 may include a disk array (e.g., a plurality of hard disk drives or solid state drives, or the like), a tape library, an optical jukebox, or the like. In some implementations, the storage device 106 may interface with a host bus adapter of the storage system 100 by way of a storage device controller (e.g., a disk array controller). A portion or all of the storage capacity of the storage device 106 may be presented or made accessible to a host as a logical unit (which may also be known as a logical disk or a virtual disk, among other terms), and a logical unit may be referred to or identified by a logical unit number (LUN). For example, as depicted in FIG. 1, the storage device 106 may present a logical unit 108. In some implementations, the storage device 106 may communicate with the host 150 via a data path 130 using a block storage protocol.

The storage manager 102 and the agent responder 104 may reside on the storage system 100 and may manage aspects the operation of the storage system 100. The storage manager 102 or the agent responder 104 may be implemented as a set of instructions encoded on a machine readable medium and executable by a processor (e.g., such as microprocessor, an application-specific integrated circuit, a field programmable gate array, and/or other hardware device suitable for retrieval and/or execution of instructions). Additionally or alternatively, the storage manager 102 or the agent responder 104 may be implemented as a hardware device comprising electronic circuitry.

As part of the management of the storage system 100, the storage manager 102 may take part in securely enrolling or registering the host 150 with the storage system 100 in a first instance (also referred to as an enrollment process). For example, the storage manager 102 may receive a LUN request from the host 150 or from another computing device under control of a user of the host 150 (e.g., an owner, administrator, operator, or the like), which may initiate the enrollment process in some implementations. In some examples, the user of the host 150 may operate a computing device that is different from the host 150 to perform some aspects of the enrollment process, including transmission of the LUN request or other aspects described below. In some implementations, the LUN request may be transmitted over a management path. The LUN request may, in some implementations, be a series of separate electronic transmissions. The LUN request may include information (e.g., parameters, data, files, etc.) related to provisioning a logical unit or related to host-storage authentication, and in some instances, some of the information may be selected or provided by the user of the host 150.

For example, the LUN request may include parameters that specify characteristics of the logical unit to be provisioned for the host 150, such as storage capacity of the logical unit, SAN zoning, LUN masking, or other parameters. In response, the storage manager 102 may allocate (create) the logical unit 108 for the host 150 accordingly and may issue a LUN (identifying the logical unit 108) to the host 150, by which the host 150 may address I/O traffic to the logical unit 108. In some instances, the storage manager 102 also may indicate to the host 150 which ports of the storage system 100 (i.e., storage port IDs) the host 150 is permitted to use for I/O traffic with the logical unit 108.

The LUN request also may include information for setting up host-storage authentication, by which the host 150 authenticates itself to the storage system 100 to gain access to the logical unit 108 (e.g., after enrollment). More particularly, as will be described in further detail below, the host 150 may include a host agent 152 that can transmit a signed data packet of credentials to the storage system 100 to be validated by the storage manager 102 based at least in part on information included in the LUN request.

In some implementations, the authentication-related information of the LUN request may include a certificate authority (CA) certificate received from the host 150, or more particularly, from a user of the host 150. For example, the CA certificate may be obtained by the user of the host 150 from a certificate authority that is either a trusted third party issuer or a private issuer (e.g., a certificate authority under the control of or trusted by the user of the host 150), and passed on to the storage system 100. In some implementations, the CA certificate may be transmitted by the host 150 (or the user of the host 150) to an administrator of the storage system 100, and the administrator of the storage system 100 may install the CA certificate to the storage manager 102 (as CA certificate 110 in FIG. 1). In other implementations, the certificate authority may transmit the CA certificate directly to the storage system 100 on behalf of the host 150 (or user of the host 150), or the storage system 100 may retrieve the CA certificate from the certificate authority based on instructions from the host 150 (or user of the host 150). The storage manager 102 may store the CA certificate 110 received from the user of the host in, for example, non-volatile memory, a registry, a hard drive, etc., which may be encrypted. The CA certificate may include a public key, and the certificate authority (or user of the host 150) may securely retain a private key that corresponds to the CA certificate 110.

In some implementations, the authentication-related information of the LUN request may include enrollment credentials associated with the host 150. The storage manager 102 may store the enrollment credentials associated with the host 150 (e.g., as credentials 112 in FIG. 1 in, for example, non-volatile memory, a registry, a hard drive, etc.). Enrollment credentials may be, for example, information that identifies the host (also referred to as host identifying credentials or host credentials), such as host manufacturing information (e.g., a serial number, a part number, a manufacturer name, etc.), hardware configuration data (e.g., information related to a type or quantity of a processor, memory, storage, or other hardware of the host 150), software configuration data (e.g., a version or serial number of an operating system or application on the host 150), a worldwide number (e.g., of the host bus adapter of the host 150), a port identifier associated with the host (e.g., a host port ID), a logical unit number (e.g., of logical unit 108 provisioned for the host 150), or other host identifying information. In some implementations, the enrollment credentials may be unique to the host 150.

Additionally or alternatively, the storage manager 102 may assign, as an enrollment credential, an agent identifier to the host 150 or the host agent 152, and may transmit the agent identifier to the host 150. In some implementations, once the agent identifier has been assigned to the host 150, the agent identifier may not be reassigned to a different host or a different configuration of the same host 150. The agent identifier may be part of a pair that includes the agent identifier and an agent identifier authenticator (e.g., a key pair). The agent identifier (or the agent identifier/agent identifier authenticator pair) may be globally unique to the storage system 100, non-transferrable between different storage systems, may be installed when the storage system 100 is manufactured, or may be generated on demand by the storage system 100.

In some implementations, the LUN request from the host 150 may instruct the storage manager 102 to expect a specified minimum subset of the stored enrollment credentials 112 (or alternatively, a full set of the enrollment credentials 112) during host-storage authentication. In other implementations, the storage manager 102 may instruct the host 150 to provide a specified minimum subset of the stored enrollment credentials 112 (or alternatively, a full set of the enrollment credentials 112) during host-storage authentication.

After the logical unit 108 has been provisioned (and the corresponding LUN transmitted to the host 150) and the storage manager 102 has stored the CA certificate 110 and the enrollment credentials 112, the host 150 may authenticate to the logical unit 108 using a signed credential packet, as will now be described. For example, the host 150 may aggregate host identifying credentials, which may be at least a subset of the enrollment credentials 112, and embed or encapsulate such credentials into a data packet of the block storage protocol (e.g., a SCSI data frame). Alternatively, the storage manager 102 may aggregate and embed the enrollment credentials 112 and transmit the resultant data packet to the host 150. In some implementations, the data packet (or a header portion of the data packet) may also include other information, such as a time stamp or a hashed time stamp, to possibly reduce security risks such as replay attacks.

In some implementations, the host 150 also may include a host public key in the data packet, and the host 150 may securely retain a corresponding host private key. The host public key and the host private key may be utilized for challenge-response authentication, as will be described below. The host 150 may generate the host public key and the host private key, or the host public key and the host private key may be allocated to the host 150 by a vendor or other entity. Alternatively, if the storage manager 102 generated an agent identifier and agent identifier authenticator pair as described above, the host 150 may utilize the agent identifier as the host private key, and the storage manager 102 may utilize the agent identifier authenticator as the host public key.

The host 150 (or a user of the host 150) may submit the data packet of host credentials to the certificate authority to be cryptographically signed using the private key corresponding to the CA certificate 110 stored at the storage manager 102, thus generating a signed credential packet. In some implementations, the data packet of host credentials may be signed by an intermediate certificate in a chain of trust linked to the certificate authority. For example, the signed credential packet may include the aggregated credentials and a digital signature, where the digital signature may be a private key-encrypted hash of the aggregated credentials. In some implementations, the certificate authority may utilize public key infrastructure (PKI) to create the CA certificate 110 and to sign the data packet of host credentials. The host agent 152 may use the signed credential packet to authenticate the host 150 to the logical unit 108. More particularly, the host agent 152 may transmit the signed credential packet 132 over the data path 130 and addressed to the logical unit 108 (e.g., using port IDs and the LUN). For example, the host agent 152 may interleave the signed credential packet 132 into a data stream on the data path 130.

The agent responder 104 may monitor packets arriving at the storage system 100 on the data path 130, and may extract from the data path 130 the signed credential packet 132 transmitted by the host agent 152. As described above, the extracted signed credential packet 132 may contain host credentials embedded in a data packet of the block storage protocol and cryptographically signed by the certificate authority trusted by the user of the host 150, and the embedded host credentials may include at least a subset of the enrollment credentials 112. The agent responder 104 may pass the extracted credential packet to the storage manager 102. In some implementations, the agent responder 104 may be a snoop protocol or snoop agent, operating between the storage manager 102 and the storage device 106.

Upon receiving the signed credential packet 132 extracted by the agent responder 104, the storage manager 102 may validate the extracted signed credential packet 132 using the stored CA certificate 110 and against the stored enrollment credentials 112. For example, the storage manager 102 may use the public key included in the stored CA certificate 110 to verify the digital signature of the signed credential packet 132, and thus verify that the sender of the signed credential packet 132 is the host 150 that installed the CA certificate 110. The storage manager 102 also may compare the host identifying credentials embedded in the signed credential packet 132 against the enrollment credentials 112. If the digital signature is successfully verified and the host credentials embedded in packet 132 match the enrollment credentials 112 (or at least a minimum subset of enrollment credentials 112), the signed credential packet 132 may be deemed successfully validated, and the storage manager 102 may proceed to issue an encrypted challenge to the host 150. For example, to create the challenge, the storage manager 102 may generate a random number and encrypt the random number using the host public key included in the extracted signed credential packet 132. In response to the challenge, the host 150 may decrypt the challenge using the host private key and may transmit the decrypted challenge back to the storage manager 102 (by way of the data path 130 and the agent responder 104) for verification against the random number. If storage manager 102 determines that the decrypted challenge matches the random number, then the host 150 is deemed to have responded to the challenge successfully.

If the signed credential packet 132 is validated successfully and the host responds to the challenge successfully, the storage manager 102 may authenticate the host 150 to the logical unit 108 on the storage device 106 (depicted as a dashed line in FIG. 1), and I/O transfers with the host may commence. Or, in other words, if the signed credential packet 132 is validated successfully, the storage manager 102 may permit I/O transfers between the host 100 and the logical unit 108. On the other hand, if the signed credential packet 132 is not validated successfully or the host 150 does not respond to the challenge successfully, the storage manager 102 may at least partially disable or prevent I/O traffic between the host 150 and the logical unit 108 by, for example, ignoring I/O requests from the host 150, allowing the host 150 read-only I/O access to the logical unit 108, or other forms of reduced access. By virtue of the challenge-response authentication, some protection may be provided against a man-in-the-middle attack and a subsequent replay attack.

Figure 2:
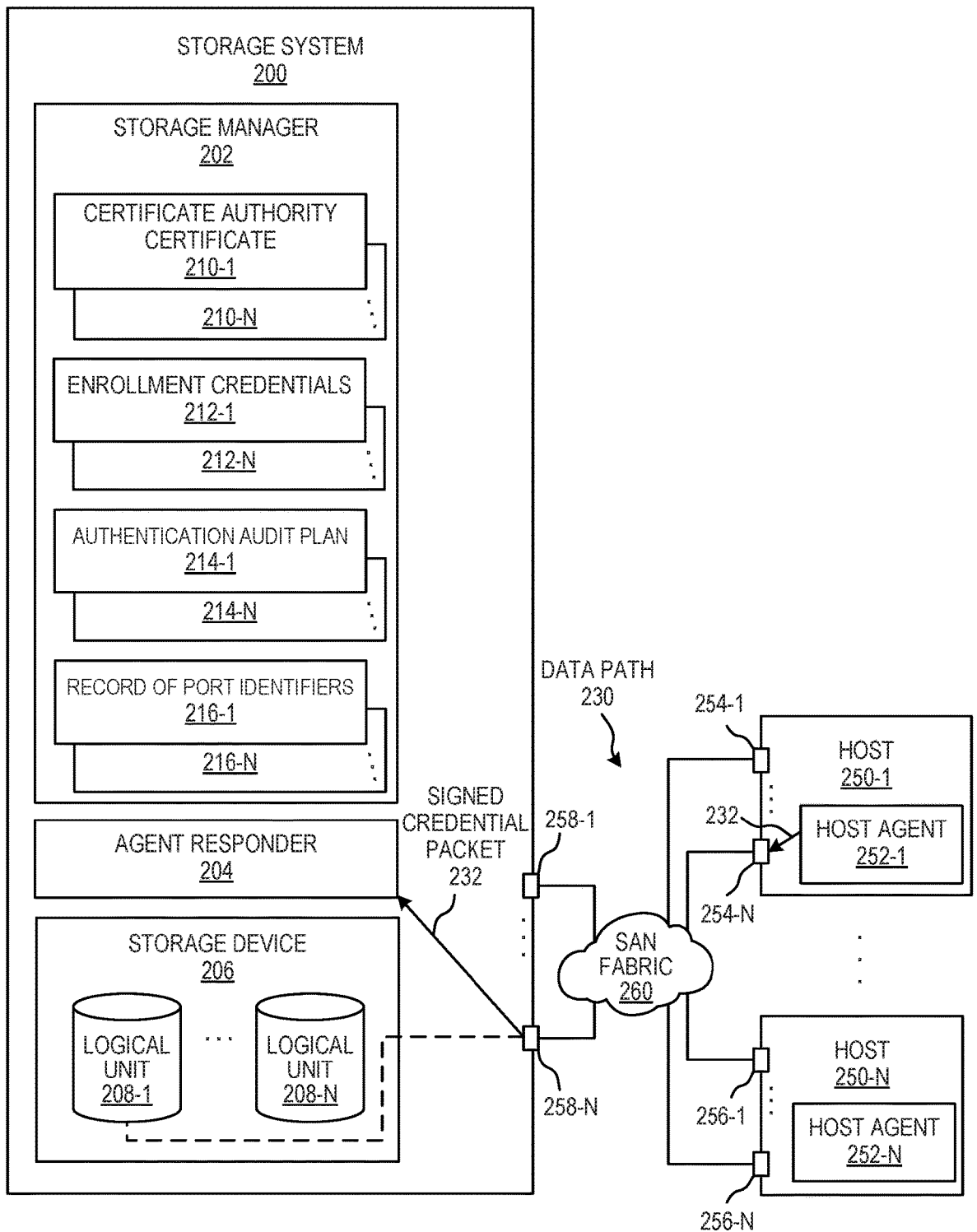
FIG. 2 is a block diagram of an example storage system, according to another implementation.

FIG. 2 is a block diagram of an example storage system 200, according to an implementation. In FIG. 2, the index number "N" appended to some of the reference numerals (e.g., 208-N, 210-N, 212-N, 250-N, 252-N, 254-N, and 256-N) may be understood to merely denote plurality and may not necessarily represent the same quantity for each reference numeral. For example, a quantity of hosts included in a plurality of hosts 250-1 through 250-N may or may not be the same as a quantity of logical units included in a plurality of logical units 208-1 through 208-N, depending on the implementation. Additionally, use herein of a reference numeral without an index (e.g., 210, 212, 214, 216, 208, 250, 252) may refer generally to any one of that element. For example, reference to a host 250 may describe any one of hosts 250-1 through 250-N.

The storage system 200 may include a storage manager 202, an agent responder 204, and a storage device 206. In some implementations, the storage manager 202 and the agent responder 204 may manage aspects of the storage system 200, including at least enrollment and authentication of hosts, as will be described below. In some implementations, the storage manager 202 and the agent responder 204 may be analogous to the storage manager 102 and the agent responder 104 with respect to enrollment and authentication. The storage manager 202 or the agent responder 204 may be implemented as a set of instructions encoded on a machine readable medium and executable by a processor (e.g., such as microprocessor, an application-specific integrated circuit, a field programmable gate array, and/or other hardware device suitable for retrieval and/or execution of instructions). Additionally or alternatively, the storage manager 102 or the agent responder 104 may be implemented as a hardware device comprising electronic circuitry. The storage device 206 may be analogous in many respects to the storage device 106 of FIG. 1, and may include, for example, a disk array, a tape library, an optical jukebox, or other storage technology.

In some implementations, the storage system 200 may provide block storage to multiple tenants. For example, the storage system 200 may be connected to a plurality of hosts 250-1 through 250-N by way of a SAN fabric 260, and at least some of the hosts 250-1 through 250-N may belong to different tenants. As but one illustration, the host 250-1 may be controlled or operated by a first tenant, and the host 250-N may be controlled or operated by a second tenant different from the first tenant. In some cases, some of the hosts 250-1 through 250-N may belong to the same tenant (i.e., a tenant may control or operate multiple hosts). In some implementations, the storage system 200 and the hosts 250-1 through 250-N may communicate I/O traffic using a block storage protocol. In some examples, the term "tenants" may refer to clients or customers of the storage system 200, individual groups within a client or customer, or other entities for which security and isolation from other tenants are prominent considerations. In some examples, the user of a host, as described above with reference to the host 150, may belong to a tenant, and multiple users may belong to the same tenant.

Each of the hosts 250-1 through 250-N and the storage system 100 may include at least one port (on a host bus adapter) for connecting to the SAN fabric 260. For example, the host 250-1 may include ports 254-1 through 254-N by which the host 250-1 may connect to the SAN fabric 260, the host 250-N may include ports 256-1 through 256-N by which the host 250-N may connect to the SAN fabric 260, and the storage system 100 may include ports 258-1 through 258-N by which the storage system 100 may connect to the SAN fabric 260. In some implementations, each port of the hosts 250-1 through 250-N may be identified by a unique host port ID, and each port of the storage system 200 may be identified by a unique storage port ID.

In some implementations, the hosts 250-1 through 250-N may be analogous in many respects to the host 150 of FIG. 1. For example, each of the hosts 250-1 through 250-N may be a server, a desktop computer, a workstation, a laptop computer, or other computing device. Additionally, each of the hosts 250-1 through 250-N may include a respective host agent 252-1 through 252-N. Moreover, each of the hosts 250-1 through 250-N may be enrolled with the storage system 200 by a LUN request to the storage system 200 (and more particularly, to the storage manager 202). In some implementations, multiple LUN requests may be submitted to the storage system 200 to provision multiple logical units for an individual host 250. In some implementations, a LUN request may be submitted by or through a host 250, or by a user of the host 250 (where such user may be operating the host 250 or a computing device different from the host 250) to the storage system 200 via a management path.

The LUN requests may be similar in many respects to the LUN request submitted to enroll the host 150 as described above, and may include information for provisioning a logical unit and for setting up host-storage authentication. For example, a LUN request to enroll a host 250 may include parameters to define the logical unit to be provisioned, such as capacity, SAN zoning, LUN masking, and the like. The storage manager 202 may allocate a logical unit (e.g., 208) to the enrolling host 250 according to the provisioning parameters and may issue and transmit a LUN (identifying the logical unit 208) to the host 250, by which the host 250 may direct I/O traffic to the logical unit 208. In some instances, the storage manager 202 also may indicate to the host 250 (or the user of the host 250) which of the storage system ports 258-1 through 258-N the host 250 is permitted to use for I/O traffic with the host's logical unit 208. In some implementations, the storage manager 202 may process multiple LUN requests for different hosts or the same host, and the storage manager 202 may correspondingly create a plurality of logical units 208-1 through 208-N on the storage device 206. In some cases, some of the created logical units may belong to different tenants and, accordingly, the storage device 206 may be deemed to be multi-tenant.

The LUN request also may include or be accompanied by information for setting up host-storage authentication, and such authentication-related information may include a CA certificate, enrollment credentials, or an authentication audit plan. In some implementations, the CA certificate is obtained by or on behalf of the host 250 (or a user of the host 250) from a trusted third party certificate authority or the tenant's private certificate authority, and is securely transmitted to the storage system 200 or an administrator of the storage system 200. To enforce isolation on the storage system 200 between tenants, hosts of different tenants may provide different CA certificates to the storage system 200 in some environments, and correspondingly, each tenant may be associated with a unique private key that is securely maintained either by the tenant or the third party issuer of the tenant's CA certificate. Depending on policies of a tenant, multiple hosts controlled by the same tenant may install the same CA certificate in some examples or may install different CA certificates in other examples.

The enrollment credentials of a LUN request may include information about the host 250, such as manufacturing information about the host 250, hardware configuration data about the host 250, software configuration data about the host 250, a worldwide number (e.g., of the host bus adapter of the host 250), a port identifier associated with the host 250 (e.g., a host port ID), a logical unit number (e.g., of logical unit 208 provisioned for the host 250), or other host identifying information. In an illustration where host 250-1 is enrolling, an example port identifier enrollment credential may include host port IDs of the host ports 254-1 through 254-N, or in some implementations, host port IDs of a subset of the host ports 254-1 through 254-N that the host 250-1 is configured to use for I/O traffic with the storage system 200 (i.e., the host 250-1 may reserve some of its host ports 254-1 through 254-N for other storage systems or purposes). In some implementations, different hosts of the hosts 250-1 through 250-N may be uniquely identified by their enrollment credentials. For example, host serial numbers included in the enrollment credentials of multiple hosts may be unique. In other examples, different hosts may transmit different sets enrollment credentials. Additionally or alternatively, the storage manager 202 may assign a unique agent identifier, as an enrollment credential, to the enrolling host 250, which may be analogous the agent identifier described above with respect to FIG. 1.

In some implementations, the authentication-related information of the LUN request may include an authentication audit plan to be employed by or enforced by the storage manager 202, in a manner described below. For example, the authentication audit plan may be a time-based audit schedule specifying an interval (e.g., annual, monthly, daily, hourly, per packet, every Monday, etc.), a time and date, or the like, at which the host 250 is to reauthenticate with the storage system 200. Additionally or alternatively, the authentication audit plan may be an event that triggers the host 250 to reauthenticate with the storage system 200, such as an event affecting connectivity between the host 250 and the storage device 206 or the logical unit 208 (e.g., a link or connection between the host 250 and its logical unit 208 disconnects or drops, either intentionally or unintentionally, or the host 250 attempts to reconnect to the logical unit 208). In some implementations, the authentication audit plan may specify how often or under what conditions a challenge-response authentication is implemented as a part of reauthentication. In some instances, a LUN request may not include an authentication audit plan. The inclusion and intensity of an authentication audit plan may depend on the security policies of the tenant and/or the user of the enrolling host 250.

The storage manager 202 may store the foregoing authentication-related information. In some implementations, the storage manager 202 may store a different CA certificate 210 for each tenant or some tenants. In some implementations, the storage manager 202 may store a CA certificate 210-1 through 210-N for each LUN request received. Accordingly, in some examples, the storage manager 202 may store a plurality of CA certificates 210-1 through 210-N. In some implementations, the storage manager 202 may store a plurality of enrollment credentials 212-1 through 212-N and a plurality of authentication audit plans 214-1 through 214-N, corresponding to enrollment credentials and authentication audit plans, respectively, received in a plurality of LUN requests.

In some implementations, as part of the enrollment process, the host 250 may perform a fabric survey by transmitting a signed credential packet over all ports that the host 250 expects to use for I/O traffic with its logical unit 208, and the storage manager 202 may detect and record port identifiers (e.g., host port IDs, storage port IDs, or the like) associated with the fabric available for connecting the host 250 and the storage device 206 (and more particularly, for connecting the host 250 and its logical unit 208). For example, in the illustration of FIG. 2, each record 216-1 through 216-N of port identifiers may be a record of the port identifiers detected during fabric surveys from one or more of the hosts 250-1 through 250-N.

In some implementations, the signed credential packet of the host 250 may be analogous to the signed credential packet 132 described above, and may include host credentials embedded in a data packet of the block storage protocol and cryptographically signed by the certificate authority that issued the CA certificate to the host 250 (or signed by an intermediate certificate in a chain of trust linked to the certificate authority). In some implementations, the host 250 also may include a host public key in the signed credential packet 132 to be used for a challenge-response authentication (in a manner similar to that described above with respect to FIG. 1). A host agent 252 of the host 250 may interleave the signed credential packet over a data path that is a path through the SAN fabric 260. In some implementations, the signed credential packet used for the fabric survey also may be used for authentication and reauthentication of the host 250, described below.

An example of the fabric survey transmission will now be described, in an illustration where the host 250-1 or a user of the host 250-1 has submitted a LUN request to the storage manager 202, and the storage manager 202 has accordingly allocated a logical unit 208-1 to the host 250-1 and stored a CA certificate 210-1, enrollment credentials 212-1, and an authentication audit plan 214-1 corresponding to the host 250-1. In the illustration, the host 250-1 also has created a signed credential packet 232. A host agent 252-1 of the host 250-1 may interleave multiple signed credential packets 232 on data paths through the host ports 254-1 through 254-N, over the SAN fabric 260, to the storage system ports 258-1 through 258-N of the storage system 200, and to the logical unit 208-1 (for clarity, one example transmission of a packet 232 through port 254-N and port 258-N is depicted in FIG. 2).

At the storage system 200, the agent responder 204 may intercept and extract the signed credential packets 232 of the fabric survey (at least some arriving from different routes and ports of the SAN), and pass the packets to the storage manager 202. The storage manager 202 may detect the port IDs used by the host 250-1 to deliver the packets 232. For example, the storage manager 202 may detect the host port IDs of the host ports 254-1 through 254-N and the storage port IDs of the storage system ports 258-1 through 258-N, and may record those detected host port IDs and storage port IDs (e.g., in a record of port identifiers 216-1). In other examples, the fabric survey may be limited to a subset of the host ports 254-1 through 254-N, possibly depending on how a user has configured of the host 250-1, and the fabric survey also may be limited to a subset of the storage system ports 258-1 through 258-N, possibly depending on which ports the storage system 200 (or an administrator thereof) has permitted the host 250-1 to use to reach the logical drive 208-1. In some implementations, the recorded port IDs may be used during subsequent authentication and reauthentication. In some implementations, respective ones of the plurality of CA certificates 210-1 through 210-N, the enrollment credentials 212-1 through 212-N, the authentication audit plans 214-1 through 214-N, and the records of port identifiers 216-1 through 216-N, stored by the storage manager 202, may correspond to a respective host enrollment.

In some implementations, the agent responder 204 may be analogous in many respects to the agent responder 104. For example, the agent responder 204 may be a snoop agent that monitors packets arriving at the storage system 200 and extracts a signed credential packet (e.g., 232) transmitted by a host agent over a data path. In some implementations, the agent responder 104 may monitor packets arriving at the storage system 100 for SCSI command phase messages that indicate (e.g., by a vendor-specific protocol extension) that a host 150 is attempting authentication or that a signed credential packet 132 is incoming on the data path 130. The agent responder 204 may pass extracted signed credential packets to the storage manager 202 for validation.

In some implementations, the storage manager 202 may select a CA certificate from among the stored CA certificates 210-1 through 210-N and may select a set of enrollment credentials from among the stored enrollment credentials 212-1 through 212-N, based on the host identity claimed in extracted signed credential packet (e.g., the agent identifier may be included in the packet to identify the host). The storage manager 202 may use the selected CA certificate to verify a digital signature of the extracted signed credential packet, and may use the selected enrollment credentials to compare against the host credentials embedded in the extracted signed credential packet. For example, based on the above illustration of host 250-1, the agent responder 204 may extract the signed credential packet 232 interleaved by the host agent 252-1 on the data path 230 and pass packet 232 to the storage manager 202 to be validated against CA certificate 210-1 and enrollment credentials 212-1. As with the storage manager 102, the storage manager 202 may deem the signed credential packet to be successfully validated if the digital signature is successfully verified and the embedded host credentials match the enrollment credentials, and the storage manager 202 may proceed to issue a challenge to the host 250 in some implementations.

In some implementations, the storage manager 202 may check whether the extracted signed credential packet was received via the recorded port identifiers (e.g., stored in at least one of the records of port identifiers 216-1 through 216-N). The storage manager 202 may check the recorded port identifiers prior to issuing the challenge to the host 250 in some cases. For example, based on the above illustration of host 250-1, if the storage manager 202 detects that an extracted signed credential packet 232 claiming to be from host 250-1 arrived at the storage system 200 via a storage port ID corresponding to storage port 258-N and via a host port ID corresponding to host port ID 254-N, and those port IDs are included in a record of port identifiers 216-1 associated with the host 250-1, then the storage manager 202 may uphold the validation of the signed credential packet 232 and may proceed to engage the host 250-1 in a challenge-response authentication. On the other hand, the storage manager 202 may deny authentication of the host 250-1 to its logical unit 208-1 if the storage manager 202 detects that the extracted signed credential packet 232 was received or arrived at the storage system 200 via a port not listed among the recorded port identifiers in record 216-1, regardless of whether the extracted signed credential packet 232 was validated successfully by the CA certificate 210-1 and enrollment credentials 212-1. By virtue of checking the ports by which the signed credential packet 232 arrived at the storage system 200, an additional layer of protection may be provided against security risks such as replay attacks from a different point in the SAN fabric 260. Moreover, by capturing the port IDs of the available fabric between the host and the logical unit, such protections may flexibly allow for port failovers and other legitimate port changes to redundant fabric.

If the storage manager 202 determines that the signed credential packet is successfully validated and the signed credential packet arrived via a port listed among the recorded port identifiers, the storage manager 202 may issue a challenge to the host 250 using the host public key, and the host 250 may respond to the challenge using the host private key, in a manner analogous to that described above with respect to FIG. 1. If the host 250 responds successfully, the storage manager 202 may authenticate the host 250-1 to access logical unit 208-1 (as indicated by a dashed line in FIG. 2). In some implementations, the storage manager 202 and the host 250 may perform a mutual challenge-response authentication.

In some implementations, the storage manager 202 may reauthenticate a host 250 according to the authentication audit plan 214 for that host 250. Reauthentication may include, for example, transmission of the signed credential packet from the host 250 to the storage system 200 followed by a subsequent challenge-response authentication. For example, the authentication audit plan may be a time-based audit schedule, and the storage manager 202 may expect to receive a signed credential packet from the host 250 within a window around the scheduled time or interval. In some implementations, the window may be user-definable (e.g., by an administrator of the storage system 200 or by a configuration parameter included in the authentication audit plan 214) and may be, for example, on the order of seconds, minutes, hours, days, etc. As another example, the authentication may be event-based, and more particularly, authentication may be triggered by a loss of connectivity or a reconnection attempt between the host 250 and the storage device 206 or logical unit 208. In some implementations, the storage system 200 may expect a signed credential packet from the host 250 within a window of time (similar to that described above) after the event.

Upon receiving the signed credential packet at the scheduled time or in response to an event, the storage system 200 may issue a challenge to the host 250 (in the manner described above). In some implementations, if the host 250 does not transmit a valid signed credential packet to reauthenticate to logical unit 208 (or fails the challenge), the storage manager 202 may at least partially disable or prevent I/O traffic between the host 250 and its logical unit 208 by, for example, ignoring I/O requests from the host 250, allowing the host 250 read-only I/O access to the logical unit 208, or other forms of reduced access. On the other hand, if the host 250 reauthenticates successfully (including successful response to the challenge), the storage manager 202 allows the host 250 continued access to its logical unit 208.

In some implementations, a tenant may control changes in access to a logical unit 208 registered or enrolled to that tenant, using the above described system of cryptographic certificates. As but one example, a tenant may register a new host (e.g., 250-2) to an existing logical unit (e.g., 208-1 registered to host 250-1) by transmitting, to the storage manager 202, a request to associate enrollment credentials of the new host to the existing logical unit, where the request may be cryptographically signed by the tenant's certificate authority using a private key associated with the CA certificate (e.g., 210-1) stored on the storage manager 202 during enrollment of the existing logical unit. By virtue of the certificate authority cryptographically signing logical unit access and enrollment changes on behalf of the tenant, an administrator or user of the storage system may be unable to unilaterally add hosts to a logical unit without permission of the tenant.

Figure 3:
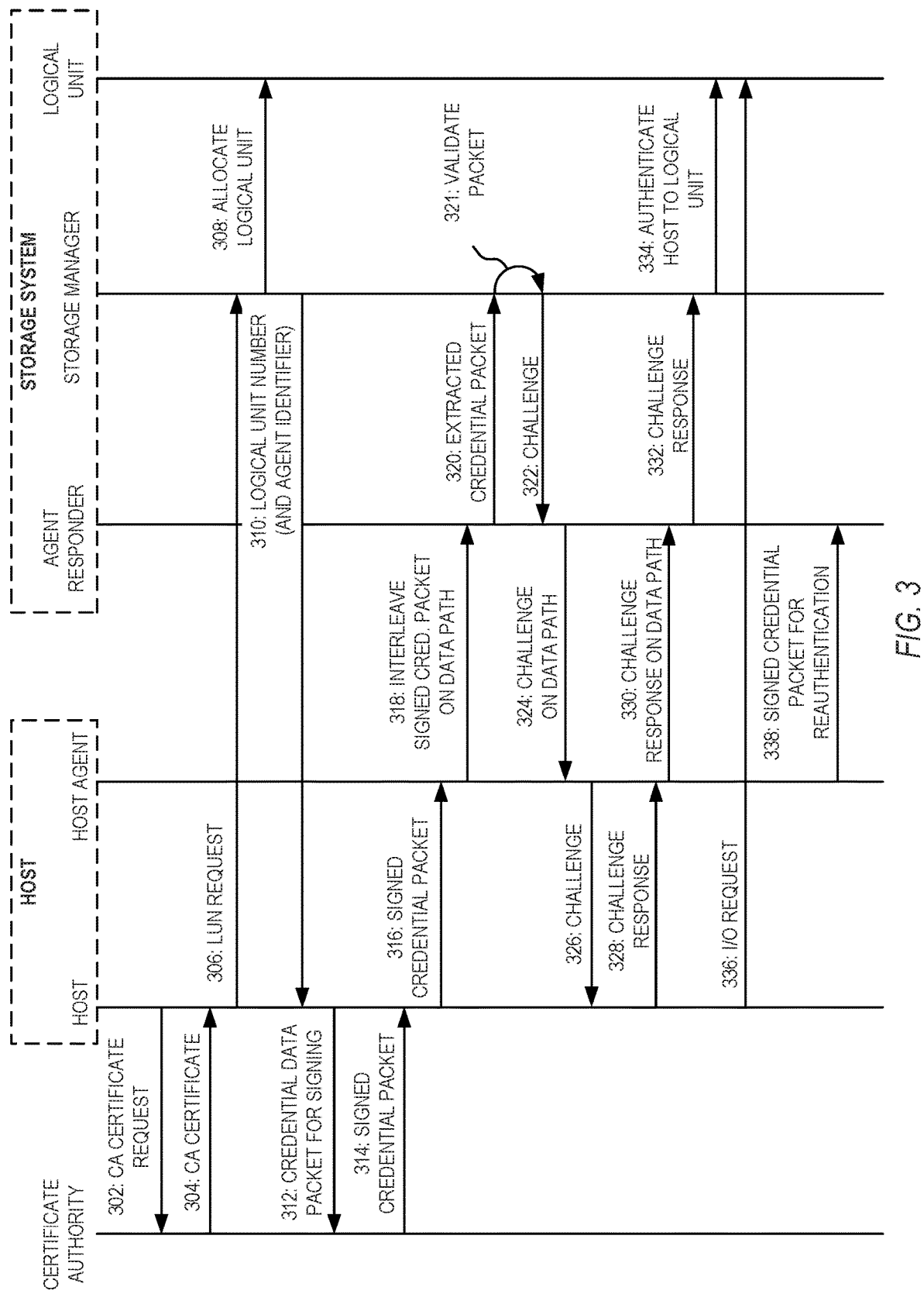
FIG. 3 is a sequence diagram of an example host enrollment and authentication process, according to an implementation.

FIG. 3 is a sequence diagram of an example host enrollment and authentication process. The process of FIG. 3 may be described below as being performed between a host and a storage system, such as the host 250 (which may include the host agent 252) and the storage system 200 (which may include the storage manager 202, the agent responder 204, and the logical unit 208) of FIG. 2. Various other suitable systems and devices may be used as well, such as the host 150 and the storage system 100 of FIG. 1.

The host 250 (or a user of the host 250) may transmit a certificate authority certificate request 302 to a certificate authority (e.g., a trusted third party issuer). The certificate authority may issue a CA certificate 304 associated with the host 250-1. The host 250 (or a user of the host 250) may transmit a LUN request 306 to the storage manager 202 of the storage system 200 (or an administrator of the storage system 200). The LUN request 306 may include parameters for allocating a logical unit (e.g., a requested capacity) and authentication information (e.g., the CA certificate 304, enrollment credentials, an authentication audit plan). In some implementations, the certificate authority may transmit the CA certificate 304 directly to the storage manager 202. The storage manager 202 may store the authentication information included in the LUN request 306 (at 308). The storage manager 202 may allocate a logical unit 208 on a storage device 206 of the storage system 200 according to the LUN request 306. The storage manager 202 may transmit a LUN 310, which identifies the logical unit 208, to the host 250 (or the user of the host 250). In some implementations, the storage manager 202 may assign or generate an agent identifier and agent identifier authenticator pair that is unique to the host 250 (or host agent 252) and may transmit the agent identifier to the host 250. In some implementations, some of the communications between the host 250 and the storage system 200 (e.g., LUN request 306 and LUN 310) may be conducted over a management path.

The host 250 (or the user of the host 250) may aggregate host credentials (which may be at least a subset of the enrollment credentials included in the LUN request 306) into a block storage protocol data packet and may submit that data packet of host credentials 312 to the certificate authority (or an intermediate certificate) for signing. The certificate authority may cryptographically sign the data packet of host credentials 312 using a private key corresponding to the CA certificate 304 to generate a signed credential packet 314 that is returned to the host 250. In some implementations, the data packet of host credentials 312 (or the signed credential packet 314) may include a host public key. The host 250 may install the signed credential packet 314 on or with the host agent 252 included on the host 250 as signed credential packet 316.

To authenticate the host 250 to the logical unit 208, the host agent 252 may interleave the signed credential packet 318, addressed using the LUN 310, on a data path. At the storage system 200, the agent responder 204 may monitor for and extract signed credential packets 318 from the data path. The agent responder 204 may pass an extracted signed credential packet 320 to the storage manager 202, which then validates (at 321) the extracted signed credential packet 320 using the stored CA certificate and enrollment credentials. If validation is unsuccessful, the storage manager 202 may disable (at least partially) I/O between the host 250 and the logical unit 208.

If validation (e.g., 321) is successful, the storage manager 202 may generate a challenge 322 (e.g., a random number encrypted with the host public key that may be included in the packet 320), and the agent responder 204 may transmit the challenge 324 on the data path to the host 250. The host agent 252 may receive the challenge 324 and pass the challenge 326 to the host 250. The host 250 may decrypt the challenge using the host private key to generate the challenge response 328, which may be passed to the host agent 252. The host agent 252 may transmit the challenge response 330 over the data path to the storage system 200. The agent responder 204 may extract the challenge response 330 from the data path and pass the challenge response 332 to the storage manager 202. The storage manager 202 may compare the challenge response 332 to the random number used to generate the challenge 322. If the challenge response 332 matches the random number of the challenge 322, the storage manager 202 may authenticate the host 250 to the logical unit 208 (at 334) and enables I/O between the host 250 to the logical unit 208, such as I/O request 336. In some cases, the storage manager 202 may could authenticate the host 250 without challenge-response authentication (e.g., without 322, 324, 326, 328, 330, 332).

The host agent 252 may reauthenticate the host 250 to the logical unit 208 by interleaving on the data path a signed credential packet 338 (which may be the same as the credential packet 318 in some implementations). As part of the reauthentication, the storage system 200 also may initiate challenge-response authentication (e.g., analogous to at least 322, 324, 326, 328, 330, 332). The host agent 252 may be configured (e.g., by a user of the host 250) to reauthenticate periodically (e.g., annually, monthly, daily, etc.), at a specified date and time, or in response to trigger events (e.g., disconnection from logical unit 208, reconnection attempt to logical unit 208).

Figure 4:
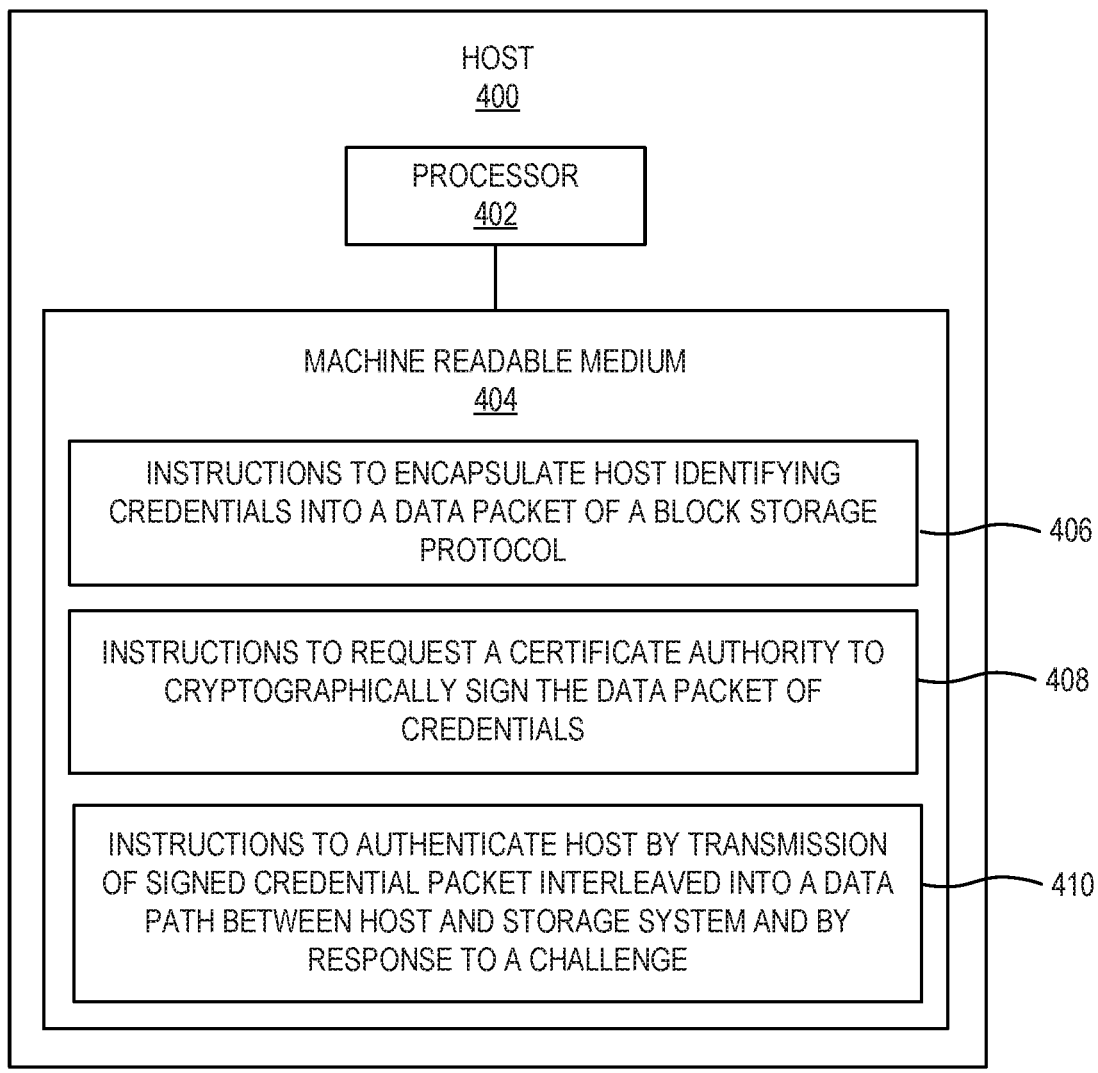
FIG. 4 is a block diagram of an example host that includes a non-transitory, machine-readable medium encoded with instructions to interleave a signed credential packet into a data path, according to an implementation.

FIG. 4 is a block diagram illustrating a host 400 that includes a machine-readable medium encoded with example instructions to interleave a signed credential packet in a data path. In some implementations, the host 400 may serve as or form part of the host 150 of FIG. 1 or the hosts 250-1 through 250-N of FIG. 2. Additionally, in some implementations, at least some aspects of the host 400 may serve as or form part of the host agent 152 of FIG. 1 or the host agents 152-1 through 152-N of FIG. 2. In some implementations, the host 400 may include at least one processor 402 coupled to a machine-readable medium 404.

The processor 402 may include a single-core processor, a multi-core processor, an application-specific integrated circuit, a field programmable gate array, and/or other hardware device suitable for retrieval and/or execution of instructions from the machine-readable medium 404 (e.g., instructions 406, 408, 410) to perform functions related to various examples. Additionally or alternatively, the processor 402 may include electronic circuitry for performing the functionality described herein, including, but not limited to, the functionality of instructions 406, 408, and/or 410. With respect to the executable instructions represented as boxes in FIG. 4, it should be understood that part or all of the executable instructions and/or electronic circuits included within one box may, in alternate implementations, be included in a different box shown in the figures or in a different box not shown.

The machine-readable medium 404 may be any medium suitable for storing executable instructions, such as random access memory (RAM), electrically erasable programmable read-only memory (EEPROM), flash memory, hard disk drives, optical discs, or the like. In some example implementations, the machine-readable medium 404 may be a tangible, non-transitory medium, where the term "non-transitory" does not encompass transitory propagating signals. The machine-readable medium 404 may be disposed within the host 400, as shown in FIG. 4, in which case the executable instructions may be deemed "installed" or "embedded" on the host 400. Alternatively, the machine-readable medium 404 may be a portable (e.g., external) storage medium, for example, that allows the self-tune controller 400 to remotely execute the instructions or download the instructions from the storage medium. In this case, the executable instructions may be part of an "installation package." As described further herein below, the machine-readable medium 404 may be encoded with a set of executable instructions 406, 408, 410.

Instructions 406, when executed by the processor 402, may encapsulate host identifying credentials into a data packet of a block storage protocol by which the host 400 communicates with a storage system (e.g., 200). In some implementations, the host identifying credentials may include a host serial number, a host hardware configuration data, a host software configuration data, a worldwide number, a port identifier associated with the host, a logical unit number, or an agent identifier uniquely assigned to the host by a storage device manager of the storage system. In some implementations, the host identifying credentials encapsulated by instructions 406 may have been selected by a user of the host from credentials collected by a discovery process executed by the host (e.g., at least in part via other instructions). In some implementations, instructions 406 also may encapsulate a host public key in the data packet.

Instructions 408, when executed by the processor 402, may request a certificate authority trusted by a user of the host 400 to cryptographically sign the data packet of credentials (encapsulated by instructions 406) to generate a signed credential packet. Instructions 410, when executed by the processor 402, may authenticate the host 400 to a logical unit (e.g., 208) of the storage system. For example, instructions 410 may transmit the signed credential packet (i.e., generated from instructions 408), interleaved into a data path between the host 400 and the storage system. At the storage system, in some implementations, the signed credential packet may be extracted by an agent responder (e.g., 204) and validated by a storage device manager (e.g., analogous to the storage manager 202), against enrollment credentials stored on the storage device manager, using a certificate authority certificate of the user that is stored on the storage device manager. The storage system also may issue a challenge, such as a random number encrypted by the host public key encapsulated in the data packet, after successful validation of the signed credential packet. In some implementations, instructions 410 may authenticate the host 400 also by a response to the challenge received from the storage system. For example, the response may be a decryption of the challenge by the host using a host private key corresponding to the host public key. The host may transmit the decrypted challenge back to the storage system for verification against the random number.

Figure 5:
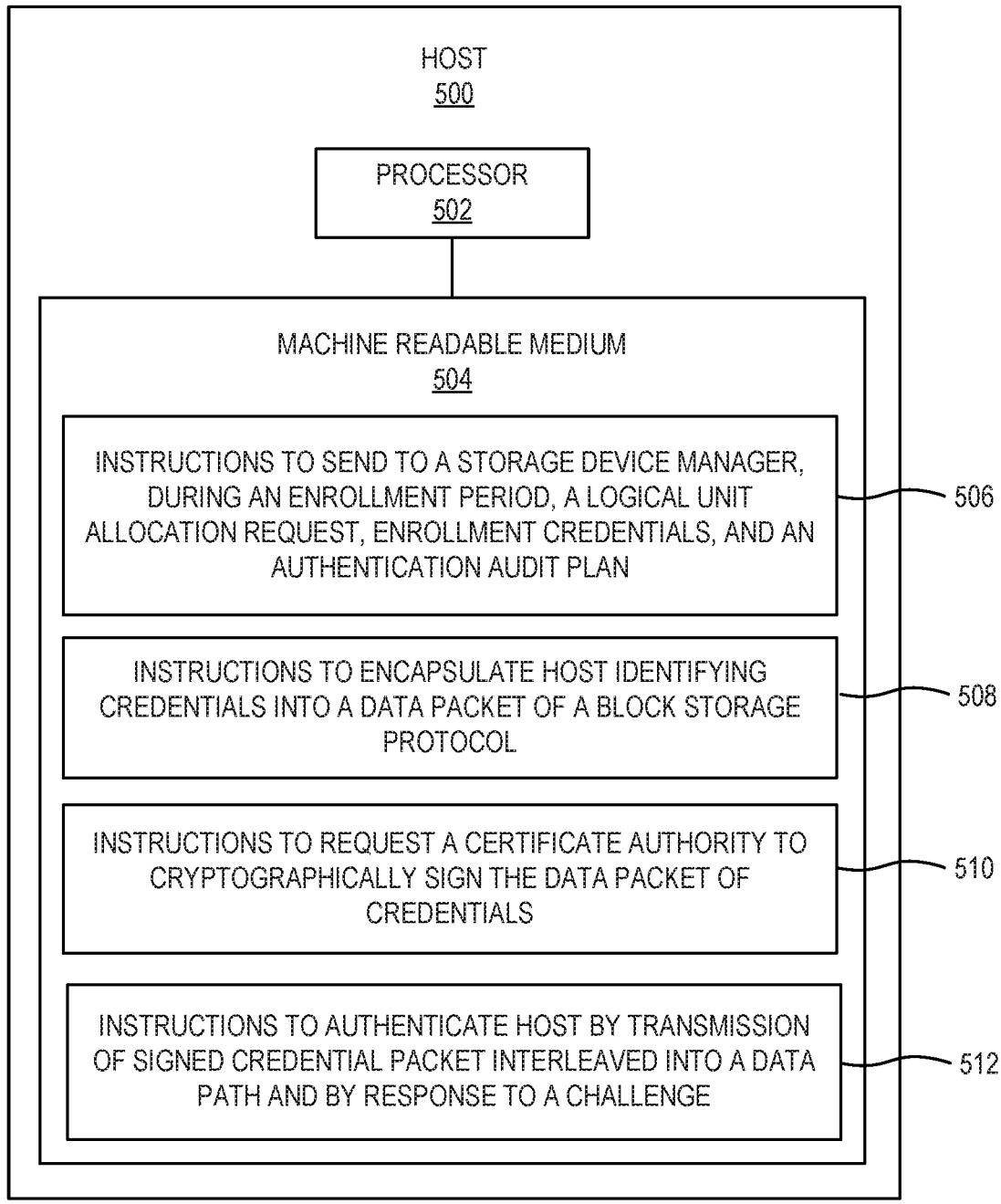
FIG. 5 is a block diagram of an example host that includes a non-transitory, machine-readable medium encoded with instructions to enroll the host with a storage system, according to an implementation.

FIG. 5 is a block diagram illustrating a host 500 that includes a machine-readable medium encoded with example instructions to enroll the host 500 with a storage system. In some implementations, the host 500 may serve as or form part of the host 150 of FIG. 1 or the hosts 250-1 through 250-N of FIG. 2. The host 500 includes a processor 502 and a machine-readable medium 504, which may be analogous in many respects to the processor 402 and the machine-readable medium 404, respectively. The machine-readable medium 504 may be encoded with a set of executable instructions 506, 508, 510, 512. Additionally or alternatively, the processor 502 may include electronic circuitry for performing the functionality described herein, including, but not limited to, the functionality of instructions 506, 508, 510, 512.

Instructions 506, when executed by the processor 502, may send to a storage device manager (e.g., 202) of a storage system (e.g., 200), during an enrollment period, a logical unit allocation request, enrollment credentials, and an authentication audit plan to be employed by the storage device manager. For example, the enrollment credentials may include a host serial number, a host hardware configuration data, a host software configuration data, a worldwide number, a port identifier associated with the host, or a logical unit number. In some implementations, the storage device manager may assign a unique agent identifier to the host 500 as an enrollment credential, upon receipt of the logical unit allocation request. The authentication audit plan may, for example, include a time-based schedule for reauthentication of the host 500 or may include an event description that, if the event occurs, may trigger reauthentication of the host. For example, the event description may relate to an event affecting connectivity between the host and the storage system, such as a disconnection or a reconnection attempt. In some implementations, instructions 506 may send (or coordinate transmission of) a CA certificate to the storage device manager. In some implementations, instructions 506 may send to the storage device manager via a management path. In some implementations, instructions 506 may perform a fabric survey and record port identifiers (as part of the enrollment period), as described above with respect to FIG. 2.

Instructions 508 may be analogous to instructions 406 described above. For example, instructions 508, when executed by a processor 502, may encapsulate host identifying credentials into a data packet of a block storage protocol by which the host 500 communicates with the storage system (e.g., 200). In some implementations, the host identifying credentials may include at least a subset of the enrollment credentials described above with respect to instructions 506. Instructions 510 may be analogous to instructions 408 and may, when executed by the processor 502, request a certificate authority trusted by a user of the host 500 to cryptographically sign the data packet of credentials (encapsulated by instructions 508) to generate a signed credential packet.

Instructions 512 may be analogous to instructions 410 and, when executed by the processor 402, may authenticate the host 500 to a logical unit (e.g., 208) of the storage system by interleaving transmission of the signed credential packet (generated by instructions 510) into a data path between the host 500 and the storage device and by responding to a challenge received from the storage system. In some implementations, instructions 512 may be executed by the processor 502 according to the authentication audit plan (e.g., the authentication audit plan sent to the storage device manager by instructions 506). For example, for an authentication audit plan that specifies annual reauthentication, the host 500 may execute instructions 512 annually to transmit the signed credential packet and respond to a subsequent challenge from the storage system, in order to reauthenticate the host 500 to its associated logical unit.

Figure 6:
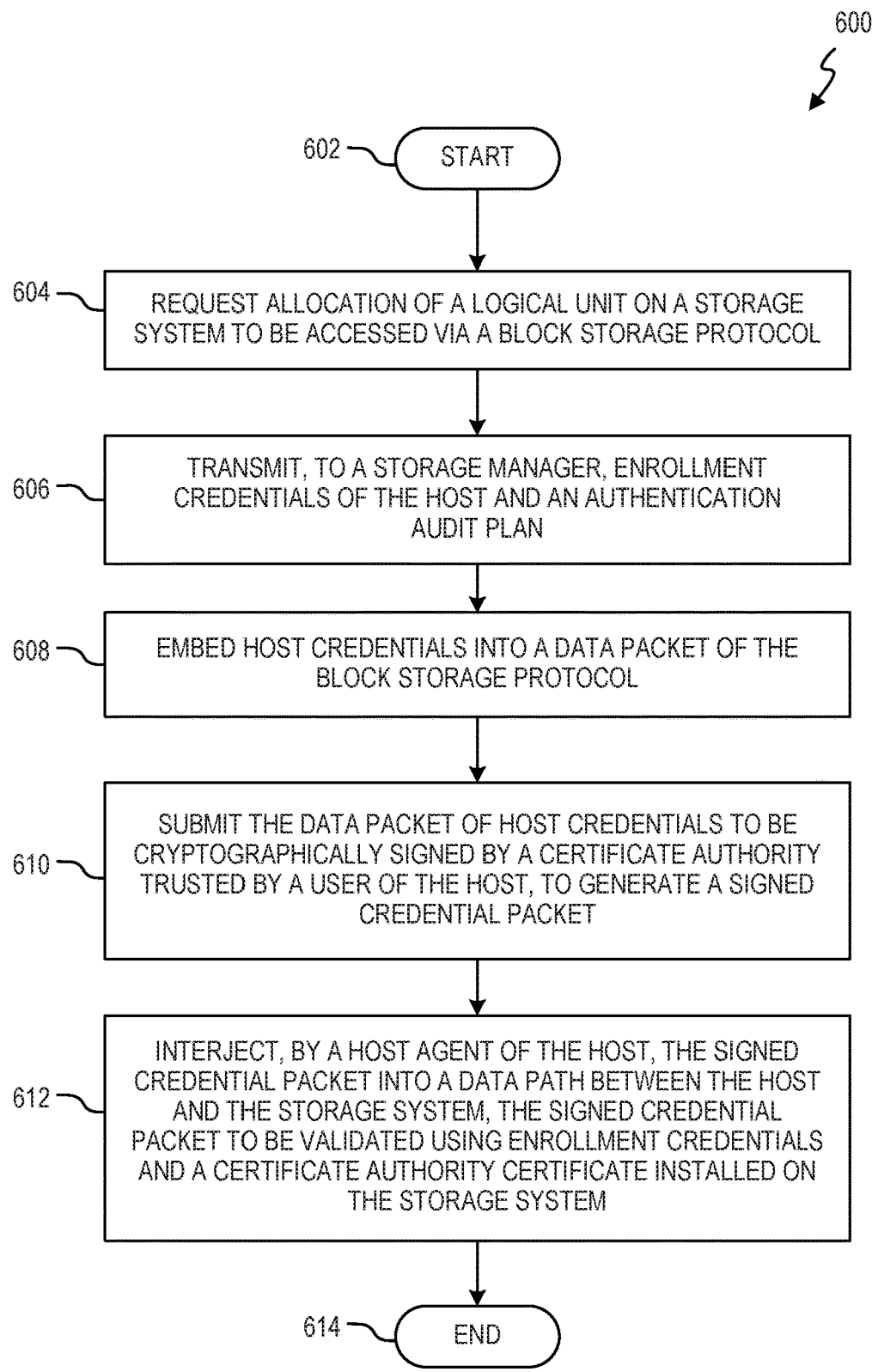
FIG. 6 is a flowchart of an example method for authenticating a host to a storage system, according to an implementation.

FIG. 6 is a flowchart of an example method 600 for authenticating a host to a storage system, according to an implementation. Method 600 may be described below as being executed or performed by a host and a host agent (included on or at the host, in some implementations), such as the host 250 and the host agent 252 of FIG. 2. Various other suitable systems may be used as well, such as, for example, the host 150 and the host agent 152 of FIG. 1. Method 600 may be implemented in the form of executable instructions stored on a machine-readable storage medium and executed by at least one processor of the host 150 or 250, and/or in the form of electronic circuitry. In some implementations of the present disclosure, one or more blocks of method 600 may be executed substantially concurrently or in a different order than shown in FIG. 6. In some implementations of the present disclosure, method 600 may include more or less blocks than are shown in FIG. 6. In some implementations, one or more of the blocks of method 600 may, at certain times, be ongoing and/or may repeat. In some implementations, prior to beginning method 600, a user of the host 250 may obtain a CA certificate from a certificate authority (e.g., either a trusted third party issuer or the user's private issuer) and may securely install the CA certificate at a storage manager (e.g., 202) of a storage system (e.g., 200).

The method 600 may begin at block 602, and continue to block 604, where the host 250 (or a user of the host 250 operating, for example, a computing device different from the host 250) may request a storage manager (e.g., 202) to allocate a logical unit on a storage system (e.g., 200) to be accessed by the host 250 via a block storage protocol. In some implementations, the host 250 may receive a LUN from the storage system in response to the logical unit request. At block 606, the host 250 may transmit, to the storage manager, enrollment credentials of the host 250 and an authentication audit plan. In some implementations, the enrollment credentials may include a host serial number, a host hardware configuration data, a host software configuration data, a worldwide number, a port identifier associated with the host, a logical unit number, an agent identifier uniquely assigned by the storage manager to the host, other host identifying credentials, or any combination of the foregoing.

At block 608, the host 250 may embed host credentials into a data packet of the block storage protocol. The host credentials may include at least a subset of the enrollment credentials transmitted at block 606. In some implementations, the host may include a host public key in the data packet at block 608. At block 610, the host 250 may submit the data packet of host credentials (generated at block 606) to be cryptographically signed by a certificate authority trusted by a user of the host 250 (or an intermediate certificate), so as to generate a signed credential packet.

At block 612, the host agent 252 may interject (or interleave) the signed credential packet (e.g., 232) generated at block 610 into a data path between the host and the storage system. In some implementations, the signed credential packet is to be extracted from the data path by an agent responder (e.g., 204) of the storage system and validated by the storage manager using the enrollment credentials (i.e., transmitted to the storage manager at block 606) and the CA certificate of the user of the host 252, where successful validation may authenticate the host 250 to the logical unit 208. In some implementations, the storage manager also may initiate a challenge-response authentication with the host 250 (in a manner analogous to that described above) after successful validation of the signed credential packet but prior to authenticating the host 250 to the logical unit 208. After block 612, the method 600 may end at block 614.

Figure 7:
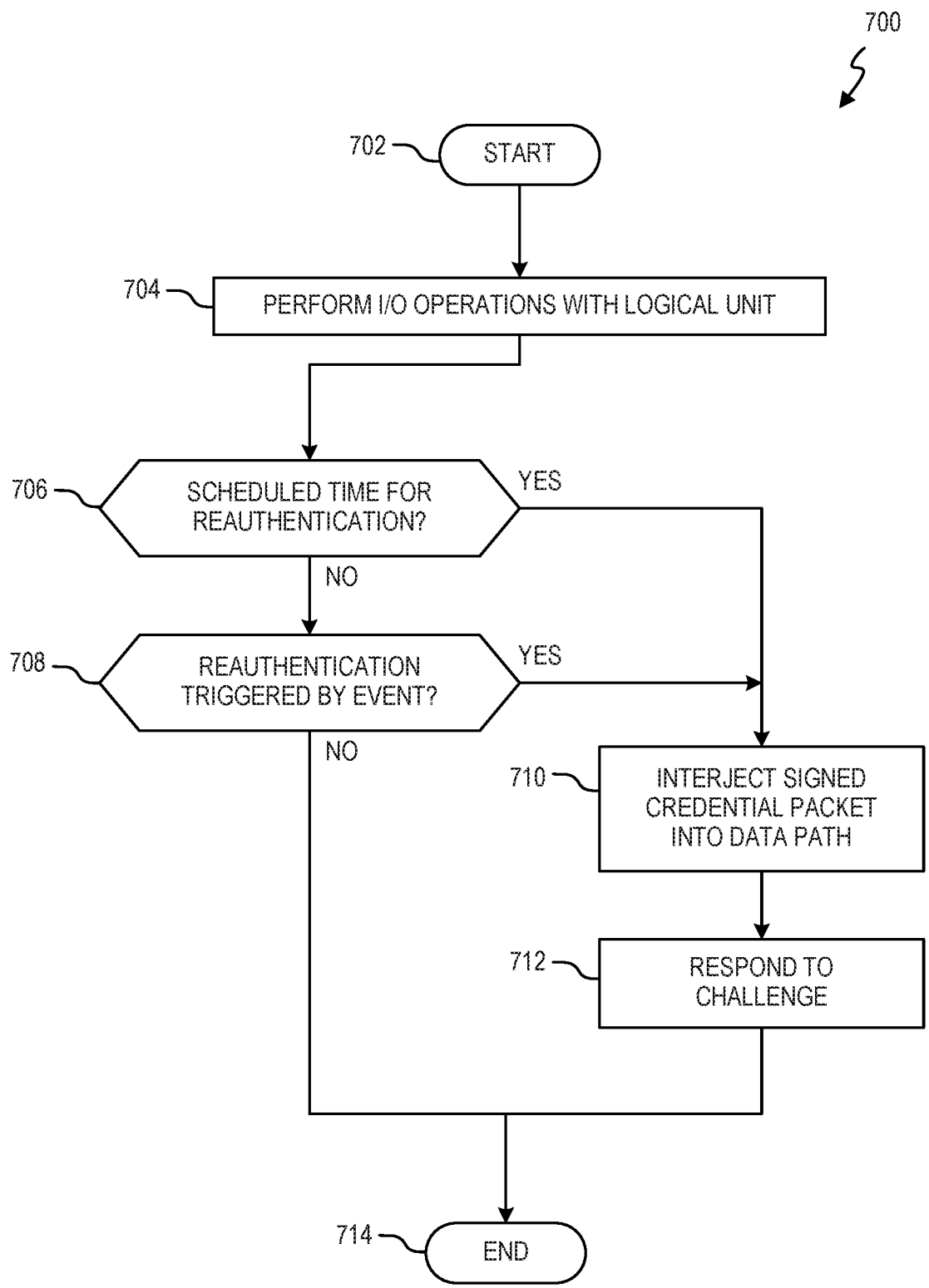
FIG. 7 is a flowchart of an example method for reauthenticating a host to a storage system, according to an implementation.

FIG. 7 is a flowchart of an example method 700 for reauthenticating a host to a storage system, according to an implementation. Method 700 may be described below as being executed or performed by a host and a host agent (included on or at the host, in some implementations), such as the host 250 and the host agent 252 of FIG. 2. Various other suitable systems may be used as well, such as, for example, the host 150 and the host agent 152 of FIG. 1. Method 700 may be implemented in the form of executable instructions stored on a machine-readable storage medium and executed by at least one processor of the host 150 or 250, and/or in the form of electronic circuitry. In some implementations of the present disclosure, one or more blocks of method 700 may be executed substantially concurrently or in a different order than shown in FIG. 7. In some implementations of the present disclosure, method 700 may include more or less blocks than are shown in FIG. 7.

In some implementations, one or more of the blocks of method 700 may, at certain times, be ongoing and/or may repeat. In some implementations, method 700 may be performed after method 600 of FIG. 6.

The method 700 may begin at block 702, and at block 704, the host 250 may perform I/O operations with a logical unit (e.g., 208) on a storage system (e.g., 200) using a block storage protocol. In some implementations, the host 250 may be configured to reauthenticate to the logical unit according to certain conditions set forth in an authentication audit plan, and correspondingly, a storage manager (e.g., 202) of the storage system may be configured (e.g., during a host enrollment period) to expect reauthentication from the host 250 also according to the authentication audit plan. For example, reauthentication conditions may be related to a time-based schedule or an event-based trigger.

At block 706, if the host 250 determines that the present time is a scheduled time (e.g., interval, specified date and time, etc.) for reauthentication under the authentication audit plan ("Yes" at block 706), control passes to block 710 described below. On the other hand, if at block 706 the host 250 determines the present time is not scheduled for reauthentication or if the host 250 is not configured with a time-based reauthentication schedule ("No" at block 706), control passes to block 708.

At block 708, if the host 250 detects or determines an occurrence of an event included in the authentication audit plan ("Yes" at block 708), such as a disconnection or reconnection attempt between the host 250 and its logical unit, control passes to block 710 described below. On the other hand, if at block 708 the host 250 does not detect or determine the occurrence of an event in the authentication audit plan or if the authentication audit plan does not include event-based triggers, control passes to block 714 where the method 700 may end. In some implementations, the method 700 may restart after block 714, and the host 250 may continue performing I/O operations.

At block 710, the host agent 252 may interject a signed credential packet into the data path (e.g., between the host 250 and the storage system 200), either at a scheduled time according to the authentication audit plan or in response to an event affecting connectivity between the host 250 and the storage system. At block 712, the host 250 may respond to a challenge issued by the storage system. In some implementations, if the signed credential packet interjected at 710 is successfully validated by the storage system 200 and the host 250 responds successfully to the challenge, the storage system 200 may return a "status good" message to the host 250. After block 712, the method 700 may end at block 714. In some implementations, the method 700 may restart after block 714, and the host 250 may continue performing I/O operations by virtue of a successful reauthentication.

In view of the foregoing description, cryptographic authentication of a host to a storage system (and more particularly, to a logical unit) may be implemented on top of native block storage protocols and over storage network data paths. Moreover, the host-storage authentication described herein accordingly may be deemed protocol agnostic, and may be implemented with little to no modification of or disruption to existing storage network architecture and infrastructure. In a multi-tenant storage environment, the host-storage authentication described herein may provide security and isolation among tenants, by virtue of, for example, hosts or tenants controlling their own certificate authority for signing credential packets. Additionally, by virtue of the host-storage authentication described herein, plug-and-play changes to host-storage topology (e.g., SAN) may be made more visible, further strengthening security. Furthermore, owing to time-based or event-based reauthentication plans, storage connections may be audited to prevent or remove connections to malicious hosts.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

We claim:

1. A storage system comprising:
a storage device to communicate with a host via a data path using a block storage protocol;
a processor; and
a machine-readable storage medium comprising instructions executable by the processor to:
extract, from the data path, a signed credential packet transmitted by a host agent of the host, the signed credential packet containing host credentials embedded in a data packet of the block storage protocol and cryptographically signed by a certificate authority trusted by a user of the host;
store a certificate authority certificate received from a user of the host,
store enrollment credentials associated with the host,
validate the extracted signed credential packet using the stored certificate authority certificate and against the stored enrollment credentials,
issue an encrypted challenge to the host, and
authenticate the host to a logical unit on the storage device if the extracted signed credential packet is validated successfully and the host responds to the challenge successfully.

2. The system of claim 1, wherein the instructions are executable by the processor to reauthenticate the host according to a time-based audit schedule or in response to an event affecting connectivity between the host and the storage device.

3. The system of claim 1, wherein the enrollment credentials include a host serial number, a hardware configuration data, a software configuration data, a worldwide number, a port identifier associated with the host, a logical unit number, or an agent identifier uniquely assigned by the storage manager to the host agent, and
the host credentials include at least a subset of the enrollment credentials.

4. The system of claim 1, wherein the instructions are executable by the processor to record port identifiers associated with a fabric available to connect the host and the storage device, and is to check whether the extracted credential packet was received via the recorded port identifiers.

5. The system of claim 1, wherein the storage device is multi-tenant, and the instructions are executable by the processor to store a different certificate authority certificate for each tenant.

6. The system of claim 4, wherein the instructions are executable by the processor to deny authentication if the extracted credential packet was received via a port not listed among the recorded port identifiers, regardless of whether the extracted signed credential packet is validated successfully.

7. The system of claim 1, wherein the instructions are executable by the processor to receive an add host request to associate enrollment credentials of a new host to the logical unit, wherein the add host request is cryptographically signed by the certificate authority.

8. A non-transitory machine readable medium, comprising instructions executable by a processor of a host to:
encapsulate host identifying credentials into a data packet of a block storage protocol by which the host communicates with a storage system;
request a certificate authority trusted by a user of the host to cryptographically sign the data packet of credentials to generate a signed credential packet; and
authenticate the host to a logical unit of the storage system by:
transmission of the signed credential packet from the host to the storage system and interleaved into a data path between the host and the storage system, the signed credential packet to be validated by a storage device manager of the storage system against enrollment credentials using a certificate authority certificate of the user that is stored on the storage device manager, and
response to a challenge received from the storage system.

9. The non-transitory machine readable medium of claim 8, wherein the enrollment credentials include a host serial number, a host hardware configuration data, a host software configuration data, a worldwide number, a port identifier associated with the host, a logical unit number, or an agent identifier uniquely assigned by the storage device manager to the host, and
the host identifying credentials include at least a subset of the enrollment credentials.

10. The non-transitory machine readable medium of claim 8, further comprising instructions to send to the storage device manager during an enrollment period, a logical unit allocation request, enrollment credentials, and an authentication audit plan to be employed by the storage device manager.

11. The non-transitory machine readable medium of claim 10, wherein the authentication audit plan includes a time-based schedule to reauthenticate the host, or
the authentication audit plan includes an event affecting connectivity between the host and the storage system, the event triggering the storage device manager to reauthenticate the host.

12. A method comprising:
requesting a storage manager to allocate a logical unit on a storage system to be accessed by a host via a block storage protocol;
transmitting, by the host to the storage manager, enrollment credentials of the host and an authentication audit plan;
embedding, by the host, host credentials into a data packet of the block storage protocol;
submitting, by the host, the data packet of host credentials to be cryptographically signed by a certificate authority trusted by a user of the host, to generate a signed credential packet; and
interjecting, by a host agent, the signed credential packet into a data path between the host and the storage system, the signed credential packet to be validated by the storage manager using the enrollment credentials and a certificate authority certificate of the user installed on the storage manager, wherein successful validation authenticates the host to the logical unit.

13. The method of claim 12, wherein enrollment credentials include a host serial number, a host hardware configuration data, a host software configuration data, a worldwide number, a port identifier associated with the host, a logical unit number, or an agent identifier uniquely assigned by the storage manager to the host, and the host credentials include at least a subset of the enrollment credentials.

14. The method of claim 12, further comprising interjecting, by the host agent, the signed credential packet into the data path at a scheduled time according to the authentication audit plan.

15. The method of claim 12, further comprising interjecting, by the host agent, the signed credential packet into the data path in response to an event affecting connectivity between the host and the storage system, the event being included in the authentication audit plan.

16. The storage system of claim 1, wherein a management path, separate from the data path, is useable to configure the storage system.

17. The non-transitory machine readable medium of claim 8, wherein a management path, separate from the data path, is useable to configure use of the data path.

18. The non-transitory machine readable medium of claim 8, wherein the instructions are executable to:

perform a fabric survey by transmitting a signed credential packet over all ports that the host expects to use for input/output (I/O) traffic with a logical unit.

19. The method of claim 12, wherein a management path, separate from the data path, is useable to configure use of the data path.

20. The method of claim 12, further comprising:

performing a fabric survey by transmitting a signed credential packet over all ports that the host expects to use for input/output (I/O) traffic with the logical unit.

* * * * *